(12) United States Patent
Andersson

(10) Patent No.: US 11,007,818 B2
(45) Date of Patent: May 18, 2021

(54) ANTI-SKID ARRANGEMENT FOR A VEHICLE

(71) Applicant: VBG GROUP AB (PUBL), Vänersborg (SE)

(72) Inventor: Ragnvald Andersson, Grästorp (SE)

(73) Assignee: VBG GROUP AB (Publ), Vanersborg (SE)

( * ) Notice: Subject to any disclaimer, the term of this patent is extended or adjusted under 35 U.S.C. 154(b) by 137 days.

(21) Appl. No.: 16/333,066

(22) PCT Filed: Sep. 14, 2017

(86) PCT No.: PCT/EP2017/073159
§ 371 (c)(1),
(2) Date: Mar. 13, 2019

(87) PCT Pub. No.: WO2018/050756
PCT Pub. Date: Mar. 22, 2018

(65) Prior Publication Data
US 2019/0263175 A1    Aug. 29, 2019

(30) Foreign Application Priority Data

Sep. 15, 2016    (EP) .................................... 16189028

(51) Int. Cl.
*B60B 39/00*     (2006.01)
*B60C 27/02*     (2006.01)

(52) U.S. Cl.
CPC ............ *B60B 39/003* (2013.01); *B60C 27/02* (2013.01); *B60B 2900/551* (2013.01); *B60B 2900/721* (2013.01)

(58) Field of Classification Search
CPC ............ B60B 39/003; B60B 2900/551; B60B 2900/721; B60C 27/02
(Continued)

(56) References Cited

U.S. PATENT DOCUMENTS 2,543,876 A * 3/1951 Smith ..................... F15B 15/12
91/210
4,054,304 A * 10/1977 Sirois .................... B60B 39/003
280/757

(Continued)

FOREIGN PATENT DOCUMENTS

DE        8526271 U1    11/1985
DE        9010749 U1    11/1991
(Continued)

*Primary Examiner* — Toan C To
(74) *Attorney, Agent, or Firm* — Murtha Cullina LLP

(57) ABSTRACT

An anti-skid arrangement for a vehicle is disclosed. The anti-skid arrangement includes a friction wheel including a hub and a ring arranged around the hub, and a chain plate attached to the hub, wherein the chain plate includes several chains intended to be thrown under the tire in order to increase friction between the tire and the ground. The hub includes two parts clamping the ring. Further, an inner side of the ring is provided with grooves extending in a tangential direction along the ring and facing each hub part, and the two parts are provided with protrusions engaging the grooves.

The engagement between the tangential grooves and the protrusions in the hub will secure the ring firmly, even when the tread of the ring is worn down.

12 Claims, 7 Drawing Sheets

(58) Field of Classification Search
USPC .......................................................... 280/757
See application file for complete search history.

(56) References Cited

U.S. PATENT DOCUMENTS

| | | | | |
|---|---|---|---|---|
| 4,299,310 | A * | 11/1981 | Torneback | B60B 39/003 |
| | | | | 188/4 R |
| 5,377,735 | A * | 1/1995 | Zeiser | B60B 39/003 |
| | | | | 152/208 |
| 5,785,351 | A * | 7/1998 | Chang | B60B 39/006 |
| | | | | 280/757 |
| 7,600,824 | B2 * | 10/2009 | Dagh | B60B 7/04 |
| | | | | 301/37.102 |
| 10,675,914 | B2 * | 6/2020 | Anderson, Jr. | B60B 39/003 |
| 2014/0338808 | A1 * | 11/2014 | McKenna | B60C 27/14 |
| | | | | 152/214 |

FOREIGN PATENT DOCUMENTS

| | | | |
|---|---|---|---|
| DE | 9211965 | U1 | 11/1992 |
| EP | 0211798 | A2 | 2/1987 |

\* cited by examiner

ANTI-SKID ARRANGEMENT FOR A VEHICLE

TECHNICAL FIELD

The present invention relates to an anti-skid arrangement for a vehicle.

BACKGROUND

Trucks, buses and emergency vehicles are examples of vehicles that for safety and other reasons may be equipped with various types of anti-skid arrangements that enhance traction and braking in slippery road conditions caused by for example snow and ice. A common type of anti-skid arrangement utilizes chains that can be engaged under the tread of a tire to improve road grip. The chains are mounted on a wheel with a ring vulcanized around a rotatable hub. The wheel is movable into and out of a position in which the ring abuts against the side of the tire, the rotation of which causes the wheel to rotate and the chains to be thrown in under the tread of the tire.

A number of technical challenges must be addressed when designing anti-skid arrangements of this type, and further efforts aimed at finding innovative solutions to these technical challenges are warranted. For example, there is a need for products with improved durability. There is also a need for designs that are easier to produce and/or that facilitate the disposal of products that have reached the end of their service life in an environmentally friendly manner.

Some examples of anti-skid devices for motor vehicles are disclosed in DE 9211965 U1, DE 8526271 U1, DE 9010749 U1, and EP 211 798. A power unit adapted to move a rotor carrying traction chains into and out of contact with a tire of an automobile is disclosed in U.S. Pat. No. 2,543,876.

SUMMARY OF THE INVENTION

In view of the above-mentioned challenges, and in view of a first aspect, there is provided an anti-skid arrangement for a vehicle. The anti-skid arrangement comprises: a friction wheel comprising a hub and a ring arranged around the hub, wherein the ring is intended to be brought in frictional engagement with a tire of the vehicle; and a chain plate attached to the hub, wherein the chain plate comprises several chains intended to be thrown under the tire in order to increase friction between the tire and the ground. The hub comprises two parts that clamp the ring. Further, an inner side of the ring is provided with grooves extending in a tangential direction of the ring and facing each hub part, and the two parts are provided with protrusions engaging the grooves.

It has been discovered by the present inventors that, by providing the hub with two parts between which the ring is clamped, it is possible attach the ring very securely to the hub, even more securely than when it is vulcanized to the hub. The engagement between the tangential grooves and the protrusions in the hub will secure the ring firmly, even when the tread of the ring is worn down. This improves the reliability of the anti-skid arrangement. The anti-skid arrangement is thus particularly suitable for especially difficult road conditions where prior art anti-skid arrangements are considered to be inadequate.

In addition to technical performance benefits, the anti-skid arrangement provides economic and environmental benefits. For example, the high level of wear resistance helps to increase the service life of the anti-skid arrangement and, therefore, to reduce end-user operational costs. Further, since the two-part hub and the ring are easy to assemble and disassemble, the manufacturing process is simplified and the various components are more easily sorted for proper environmental disposal compared with, for example, the case where the ring is vulcanized to the hub.

The ring needs to be rotationally fixed in relation to the hub. One way to achieve this is to simply ensure that the groove-protrusion engagement is strong enough also in the tangential direction. However, it may be beneficial that at least one of the two parts is provided with projections engaging the ring so as to rotationally fix the ring in relation to the hub.

The grooves may be formed by discrete sections separated by gaps, in which case wherein the projections of at least one of the two parts may engage these gaps.

Alternatively, the grooves may extend continuously around the ring, and the ring may be provided with fixating elements extending radially inwards from the grooves, in which case wherein the projections of at least one of the two parts may engage the ring between these projections.

An outer side of the ring may be inclined with respect to a central axis of the friction wheel. The friction wheel is typically inclined with respect to the horizontal when in contact with the tire because the chains are then less likely to drag along the ground during the part of their rotation where they are not underneath the tire. Making the outer side of the ring, i.e. the side of the ring that is put into contact with the tire, slightly inclined may increase the contact area, and hence the frictional engagement, between the ring and the tire.

The two parts may be provided with corresponding protruding pins and recesses. The pins and recesses engage each other so as to rotationally fix the two parts relative to each other.

At least one drainage hole may be provided in at least one of the two parts. The wheel is subjected to dirt, snow and/or ice thrown up by the rotating tires of the vehicle. The drainage hole provides for efficient removal of matter that enters the friction wheel, whereby wear on the bearings and other components of the friction wheel is reduced.

The two parts and the chain plate may be clamped together by fasteners extending through the two parts and the chain plate. This is an effective and simple way of holding the components of the friction wheel firmly together and may result in a particularly firm clamping of the ring.

The anti-skid arrangement may comprise at least one bearing which enables the friction wheel to rotate around the central axis and which is sandwiched between the two parts. A particular advantage of having a two-part hub is that this makes it possible to sandwich the bearing between the two parts, something which is simpler from a manufacturing perspective than the typical prior art practice which is to press or screw the bearing into a one-piece hub. One reason the manufacturing process is simplified is that several complicated machining steps that are usually required in prior art techniques are no longer required. For example, it is no longer necessary to machine a groove in the hub for a circlip, or similar type of fastener, used to retain one or more bearings in place.

To further improve and facilitate the mounting of bearing (s), one or both of the hub parts may have an annular ridge around the central axis, which ridge forms a compartment for the bearing(s). To improve alignment, especially in the case of several bearings, it may be advantageous to have the compartment formed only in one of the hub parts.

The two parts may have different diameters. This is typically the case when the surface of the ring is inclined with respect to a central axis of the friction wheel.

Grooves facing different parts of the hub may be displaced in a radial direction of the friction wheel relative to each other. This is typically the case when the surface of the ring is inclined with respect to the central axis of the friction wheel and the radial thickness of the ring is uniform. It is advantageous to make the radial thickness of the ring uniform as this reduces the weight and the cost of the ring.

As is clear from the above discussion, the hub parts may be different. However, according to some embodiments of the invention, the two hub parts are identical. Such design simplifies the manufacturing of the two parts in several ways. For example, both of the two parts may be produced using the same machine. The term "identical" is here not meant to exclude differences that are within manufacturing tolerances.

It is noted that the invention relates to all possible combinations of features recited in the claims.

BRIEF DESCRIPTION OF THE DRAWINGS

The present invention will now be described in more detail with reference to the appended drawings.

FIG. 4b shows a top view of the anti-skid arrangement in FIG. 4a.

DETAILED DESCRIPTION

Figure 1A:
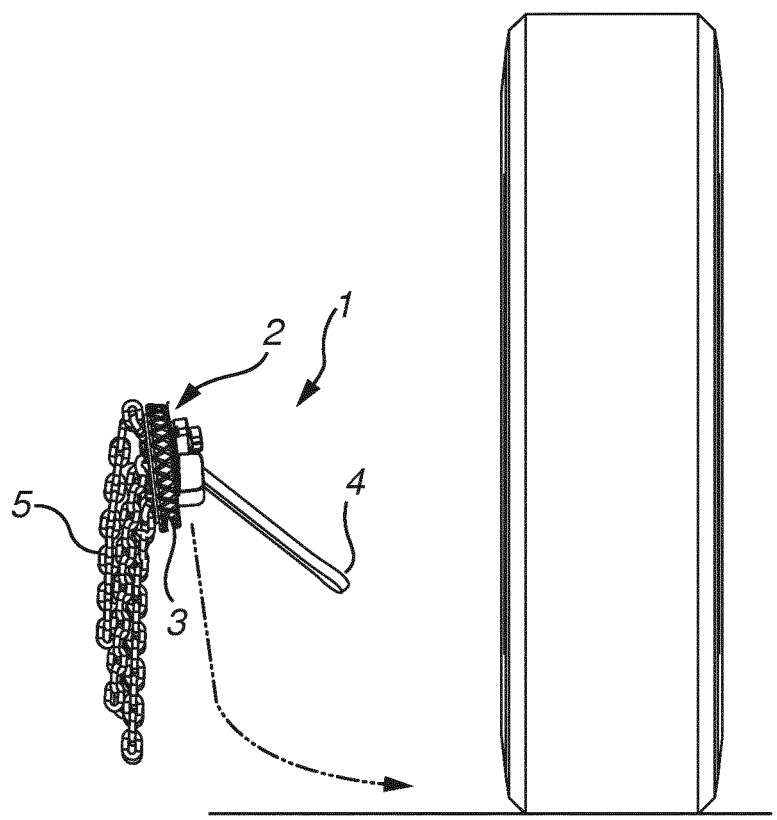
FIGS. 1a and 1b show an anti-skid arrangement, according to an example embodiment of the invention, during use.
Figure 1B:
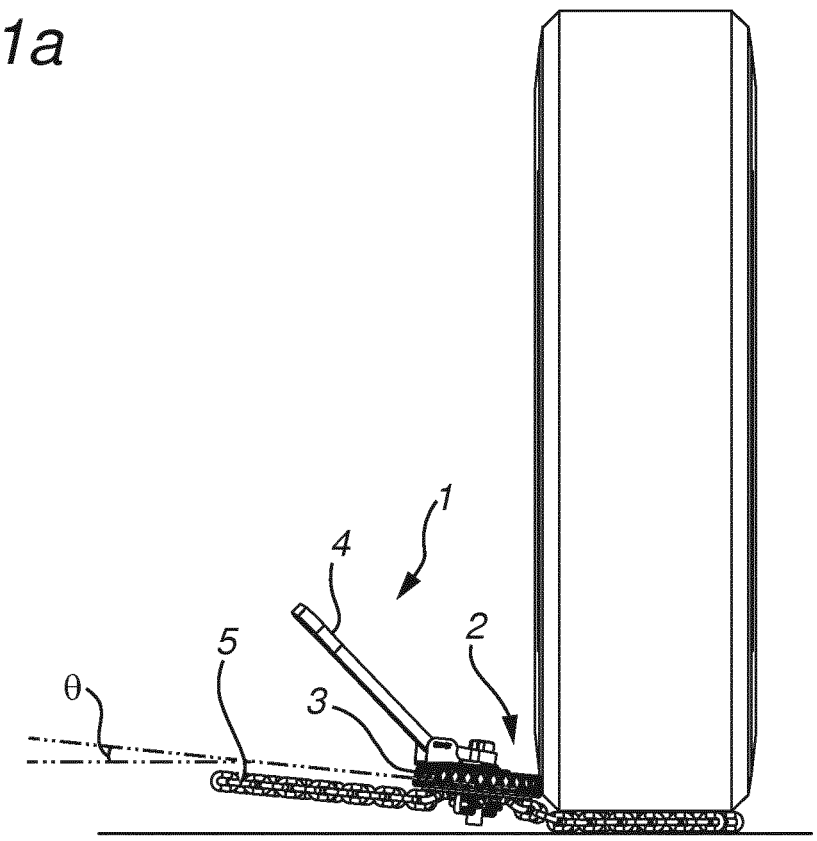

FIGS. 1a and 1b show an anti-skid arrangement 1 which is mounted to the underside of a vehicle (not shown) and which is movable between an inactive position (see FIG. 1a) and an active position (see FIG. 1b). The anti-skid arrangement 1 has a friction wheel 2 including a hub and a ring 3. The ring 3 has a circular shape. In the inactive position, the ring 3 is not in frictional engagement with a tire of the vehicle, whereas, in the active position, the ring 3 is in frictional engagement with a tire of the vehicle. Typically, the vehicle is provided with a system that enables the driver of the vehicle to activate the anti-skid arrangement 1 by pushing a button on a dashboard inside the vehicle. Upon activation, an operating arm 4 mounted to the vehicle and to the friction wheel 2 moves so that the ring 3 is brought into frictional engagement with a rotating tire. The operating arm 4 is thus mounted to the vehicle so that the anti-skid arrangement 1 is movable between the active position and the inactive position. The operating arm 4 may for example be pivotally mounted to the vehicle. The frictional engagement between the tire and the ring 3 causes the friction wheel 2 to start to rotate and chains 5 mounted to the friction wheel 2 to be flung radially outwards by the centrifugal force and drawn in under the tire tread.

Usually, the vehicle has two anti-skid arrangements 1 arranged to cooperate with a respective one of two oppositely arranged tires. The tires to which the friction wheels 2 are brought into contact are preferably driving tires for maximum increase in road grip. Also, the plane in which the friction wheel 2 rotates advantageously makes an angle θ with the horizontal as the chains 5 are then less likely to be dragged along the ground when they are not underneath the tire. Of course, if the rotation plane of the friction wheel 2 makes an angle θ with the horizontal then the rotation plane makes an angle θ with the (vertical) side of the tire. The angle θ may for example be in the range 5°-15°, alternatively 8°-12°. The angle θ may be 10°.

Figure 2A:
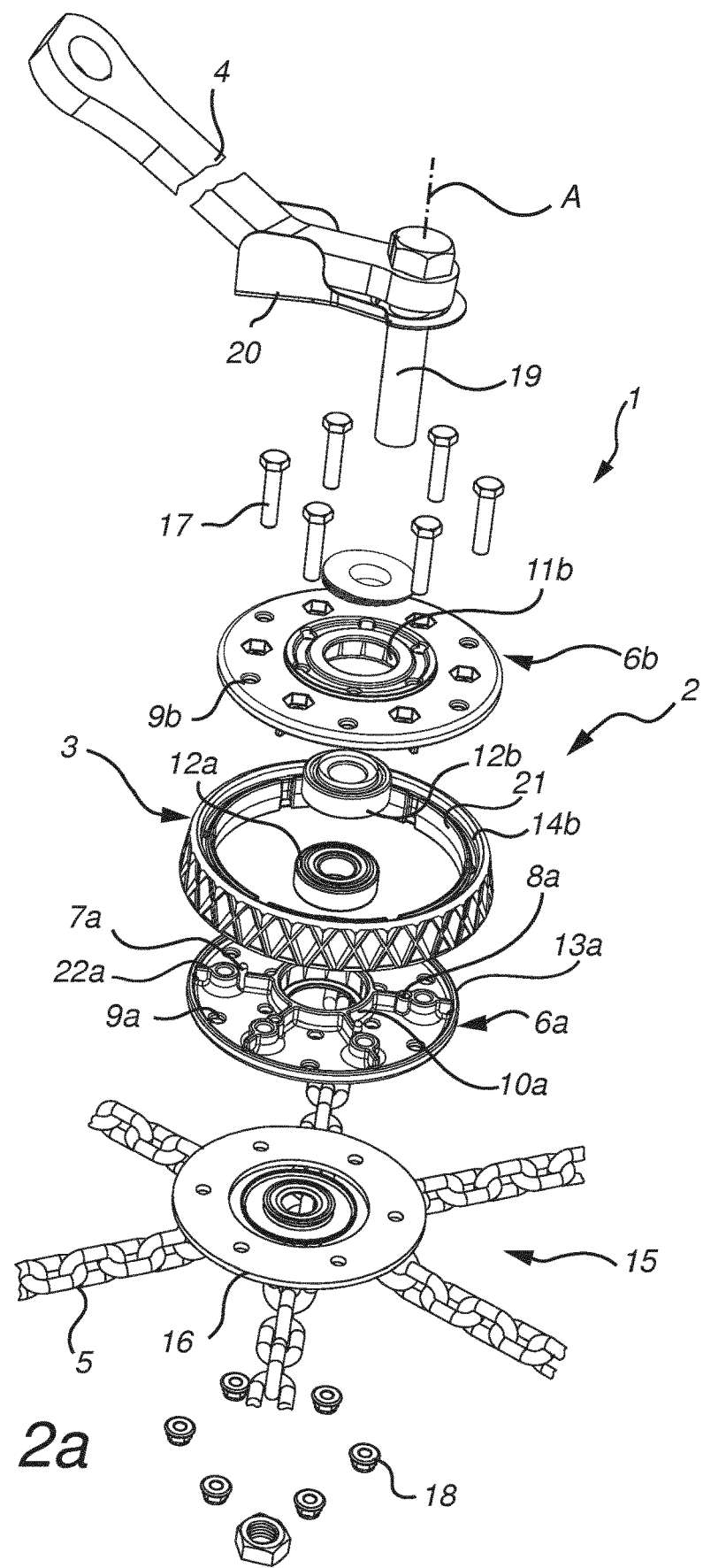
FIGS. 2a and 2b show exploded views of the anti-skid arrangement in FIGS. 1a and 1b.
Figure 2B:
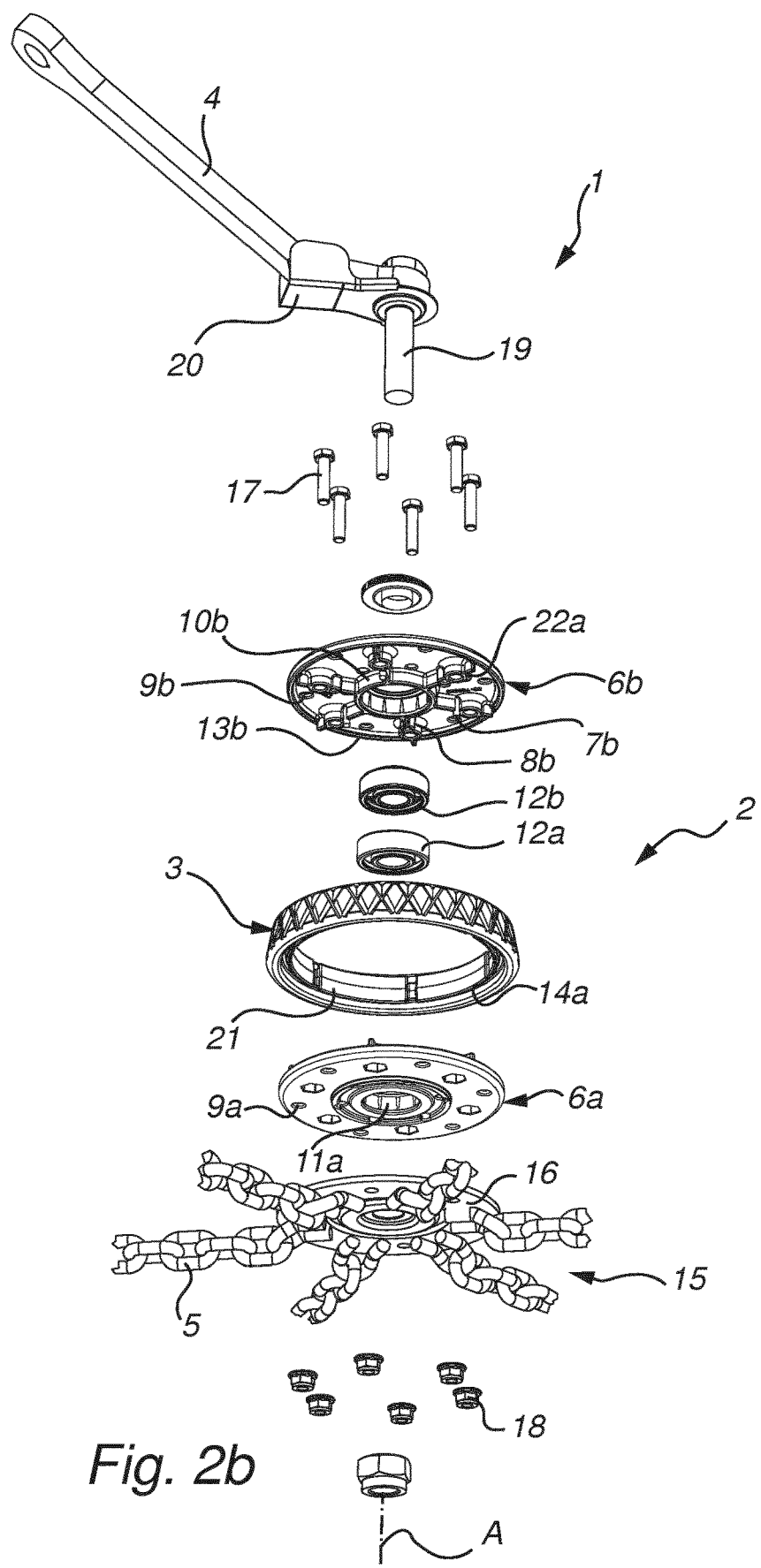

FIGS. 2a and 2b show the anti-skid arrangement 1 in FIGS. 1a and 1b in more detail. The friction wheel 2 is circular and rotatable around a central axis A. The central axis A may thus be referred to as the rotation axis of the friction wheel 2. The friction wheel 2 is provided with a two-part hub, i.e. the hub has two parts 6a, 6b which henceforth will be referred to as the lower part 6a and the upper part 6b, respectively. Other designations may of course be used. For example, the lower part 6a may be referred to as the first part and the upper part 6b may be referred to the second part, or vice versa. The lower part 6a and the upper part 6b are arranged opposite to each other and substantially perpendicular to the central axis A. In the embodiment illustrated in FIGS. 2a and 2b, the lower part 6a is identical to the upper part 6b. The two parts 6a, 6b are circular and have a plate-like shape. The diameter of the two parts 6a, 6b depend on application-specific requirements, but is typically in the range 150-250 mm. The two parts 6a, 6b may be made of any suitable material, such as steel, aluminum or some other suitable metal. The two parts 6a, 6b may be made of a composite.

Protruding pins 7a, 7b and recesses 8a, 8b are provided on the side of each of the two parts 6a, 6b that faces the other part. The positions of the protruding pins 7a of the lower part 6a match the positions of the recesses 8b of the upper part 6b, and vice versa, so that the protruding pins of one of the two parts 6a, 6b engage with the recesses of the other one of the two parts 6a, 6b by sticking thereinto. The recesses 8a, 8b and protruding pins 7a, 7b help to fix the two parts 6a, 6b together securely and to prevent relative movement between the two parts 6a, 6b during rotation of the friction wheel 2.

The two parts 6a, 6b have respective drainage holes 9a, 9b through which dirt and water that has entered the hub can exit. The drainage holes 9a, 9b may be circular holes with adequate diameter to allow drainage of water. All of the drainage holes 9a, 9b may, but do not have to, have the same diameter.

Each of the lower and upper parts 6a, 6b has an annular ridge 10a, 10b arranged around an opening 11a, 11b centered on the central axis A. Each annular ridge 10a, 10b forms a compartment in which two bearings 12a, 12b are arranged. The two bearings 12a, 12b are thus sandwiched between the two parts 6a, 6b. Due to the significant forces involved, two bearings are typically required, but applications with one single bearing are possible.

The lower part 6a has one protrusion 13a arranged on the side that faces the upper part 6b, and the upper part 6b has one protrusion 13b arranged on the side that faces the lower part 6a. The protrusion 13a of the lower part 6a is arranged directly opposite to the protrusion 13b of the upper part 6b. The protrusions 13a, 13b are annular. In the illustrated example, the protrusions 13a, 13b are formed by the raised circumferential edges of the two parts 6a, 6b.

The ring 3 is clamped between the lower and upper parts 6a, 6b. The ring 3 is adapted for frictional engagement with a tire of a vehicle. The ring 3 is typically made of a high-friction material such as rubber. The outer surface of the ring 3 has a patterned structure for better grip with a tire. The pattern may for example be formed by ribs, ridges, recesses and/or protrusions. The outer surface of the ring 3 is in this example inclined with respect to the central axis A. The inner side of the ring 3, i.e. the side of the ring 3 that faces the central axis A, is provided with grooves 14a, 14b extending in a tangential direction of the ring 3. The protrusions 13a, 13b of the two plates 6a, 6b engage the grooves 14a, 14b. More precisely, the protrusions 13a of the lower plate 6a stick into the grooves 14a that face the lower plate 6a, and the protrusions 13b of the upper plate 6b stick into the grooves 14b that face the upper plate 6b.

As can be seen in FIGS. 2a and 2b, the grooves 14a, 14b are circular. It can also be seen that in this embodiment the grooves 14a, 14b extend discontinuously along the ring 3. The grooves 14a, 14b are formed by discrete elements 21 on the ring 3. The discrete elements 21 are separated by gaps, and the lower and upper parts 6a, 6b engage the gaps. More precisely, the lower and upper parts 6a, 6b have projections 22a, 22b that stick into the gaps and, thereby, help to rotationally fix the ring 3 to the hub. The projections 22a of the lower part 6a are arranged opposite to the projections 22b of the upper part 6b. The projections 22a, 22b are adjacent to the raised circumferential edges of the lower and upper parts 6a, 6b. Each of the lower and upper parts 6a, 6b has a total of six projections 22a, 22b, although that number may be less or greater than six in a different example.

A chain plate 15 is attached to the lower part 6a. The chain plate 15 comprises an annular plate 16 to which the chains 5 are attached. All of the chains 5 have substantially the same length which typically is in the order of a few dm. The chains 5 are made of a hard material that is capable of withstanding substantial wear and tear, such as steel.

Six screws 17 extend through holes in the two parts 6a, 6b and through holes in the annular plate 16. The number of screws may be smaller or greater than six in another example. Nuts 18 are screwed onto the screws 17 on the same side of the friction wheel 2 as the chain plate 15. In the illustrated example, the heads of the screws 17 are lowered into fixating holes in the upper part 6b, facilitating mounting of the nuts. The screws 17 and nuts 18 form fasteners that clamp the lower part 6a, the upper part 6b and the chain plate 15 together. It should be noted that, in a different example, the orientation of the screws 17 may be reversed, and the nuts 18 would then be located on the other side of the friction wheel 2, i.e. on the same side as the upper part 6b.

The operating arm 4 is mounted to the upper part 6b by means of a central bolt 19 that extends along the central axis A through the central openings 11a, 11b and the bearings 12a, 12b. The friction wheel 2 is rotatable relative to the central bolt 19 and the operating arm 4. Depending on the application, the operating arm 4 may comprise several straight and bent portions.

The anti-skid arrangement 1 further comprises a protective member 20 that helps to prevent the chains from entering into the space between the operating arm 4 and the friction wheel 2. The protective member 20 has a portion which is arranged between the operating arm 4 and the upper part 6b. The protective member 20 also has two side walls, or tabs, that extend along opposite sides of the operating arm 4, substantially parallel to the central axis A.

Figure 3A:
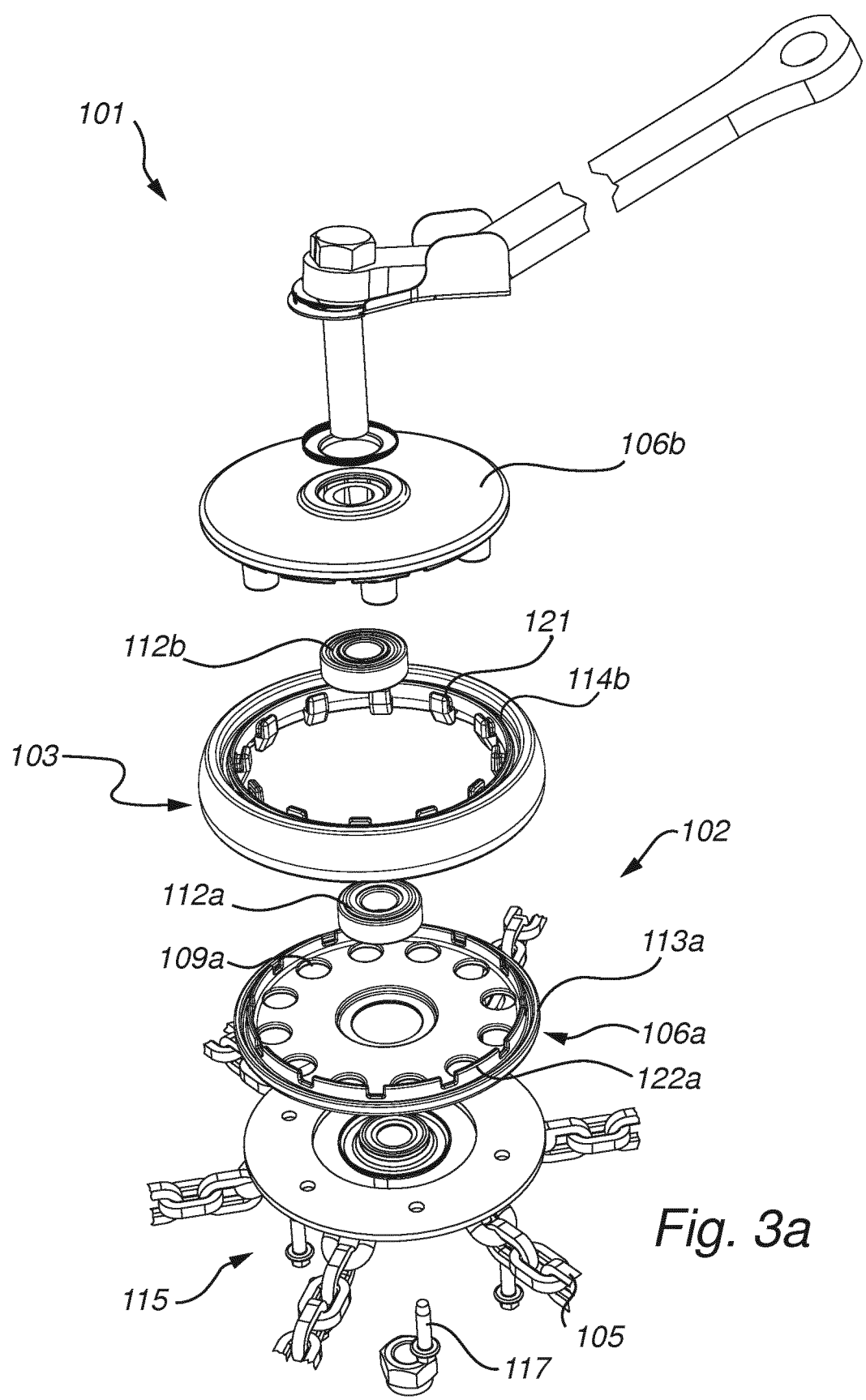
FIGS. 3a and 3b show exploded views of an anti-skid arrangement according to another example embodiment of the invention.
Figure 3B:
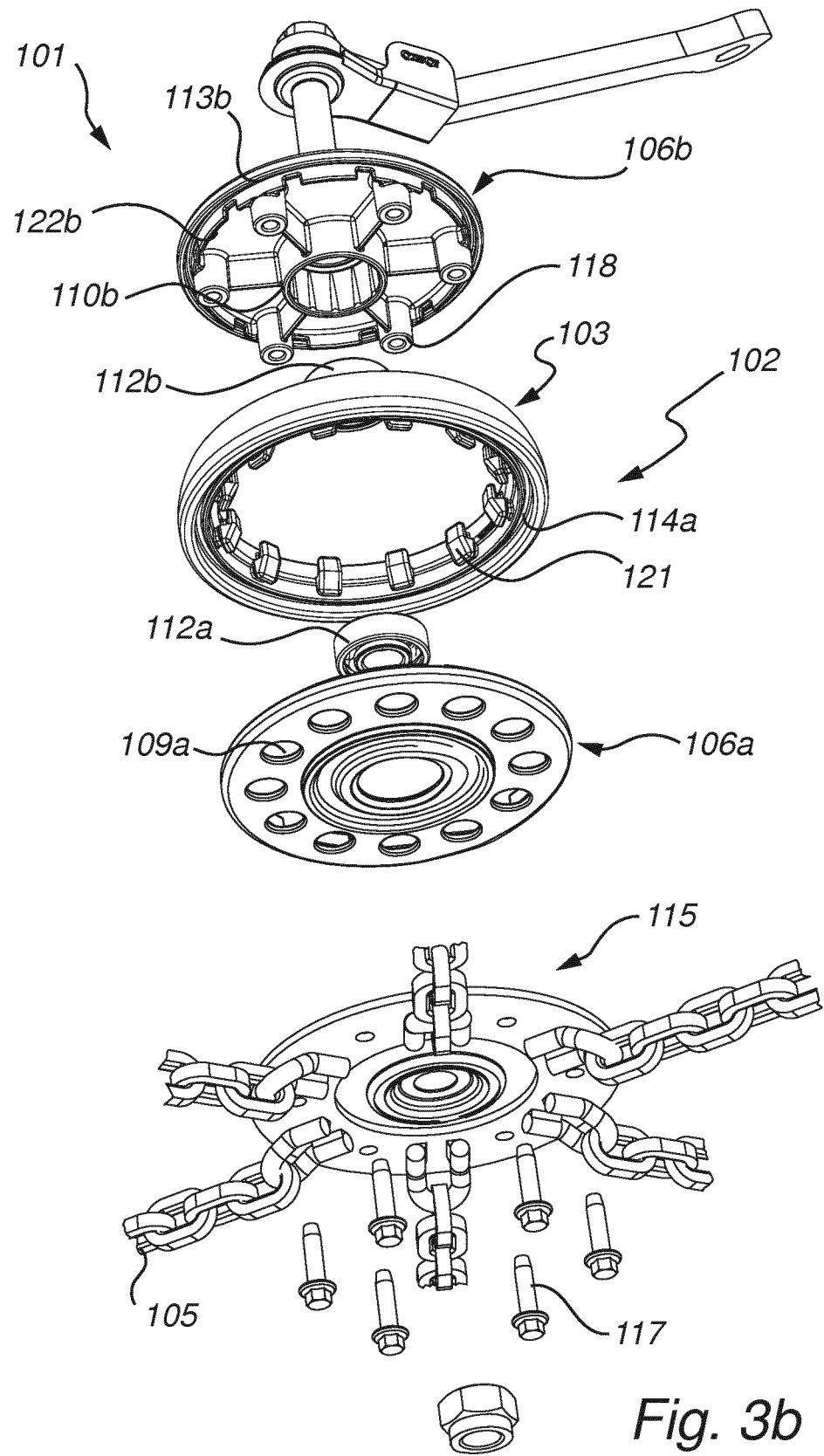

FIGS. 3a and 3b show an anti-skid arrangement 101 which is similar to the one described above with respect to FIGS. 1a to 2b, a few differences between the two embodiments being indicated in the following. For example, the lower and upper parts 106a, 106b of the hub in FIGS. 3a and 3b are not identical. One difference between the two parts 106a, 106b is that several drainage holes 109a are provided in the lower part 106a. The upper part 106b, on the other hand, does not have any drainage holes. Another difference between the two parts 106a, 106b is that the lower part 106a has no bearing compartment. An annular ridge 110b in the upper part 106b forms a compartment housing two bearings 112a, 112b.

The lower and upper parts 106a, 106b have a respective protrusion 113a, 113b that faces the other part. The protrusions 113a, 113b are formed by the raised circumferential edges of the two parts 6a, 6b. The two hub parts 106a, 106b have different diameters, so the protrusions 113a, 113b are displaced in the radial direction relative to each other. More precisely, the protrusion 113a of the lower part 106a is displaced outwards in the radial direction of the friction wheel 102 relative to the protrusion 113b of the upper part 106b.

The inner side of the ring 103 has a groove 114a facing the lower part 106a and a groove 114b facing the upper part 106b. The grooves 114a, 114b extend in a tangential direction of the ring 103. As can be seen in FIGS. 3a and 3b, the grooves 114a, 114b are circular. It can also be seen that in this embodiment the grooves 114a, 114b extend continuously along the ring 103. The positions of the grooves 114a, 114b match the positions of the protrusions 113a, 113b which, thereby, can engage the grooves 114a, 114b by sticking thereinto. The ring 103 also has several fixating elements 121 extending radially inwards from the grooves 114a, 114b. The lower and upper parts 106a, 106b have projections 122a, 122b that engage the ring 103 by sticking into gaps between the fixating elements 121. The projections 122a, 122b thereby help to rotationally fix the ring 3 to the hub. The projections 122a of the lower part 106a are arranged opposite to the projections 122b of the upper part 106b. The projections 122a, 122b are adjacent to the raised circumferential edges of the lower and upper parts 106a, 106b. In the illustrated example, the projections 122a, 122b are elongated along the circumference of the lower and upper parts 106a, 106b. Such projections 122a, 122b help to absorb radial forces acting on the ring, something which help to reduce the risk that a worn ring is pushed into the hub.

The two parts 106a, 106b, the ring 103, and the chain plate 115 with the chains 105 are here held together by fasteners in the form of self-tapping screws 117. The upper part 106b has pre-drilled holes 118 for engaging the screws 117.

Figure 4A:
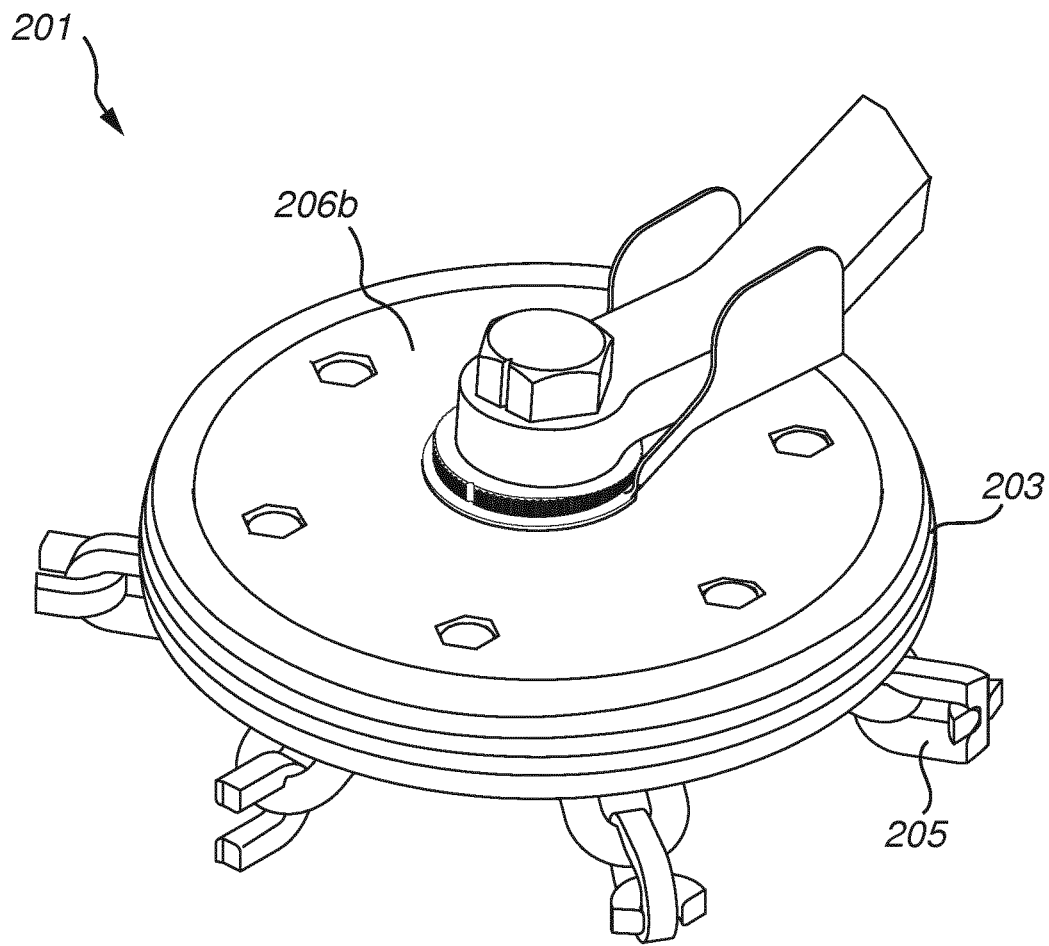
FIG. 4a shows a perspective view of an anti-skid arrangement according to yet another example embodiment of the invention.
Figure 4B:
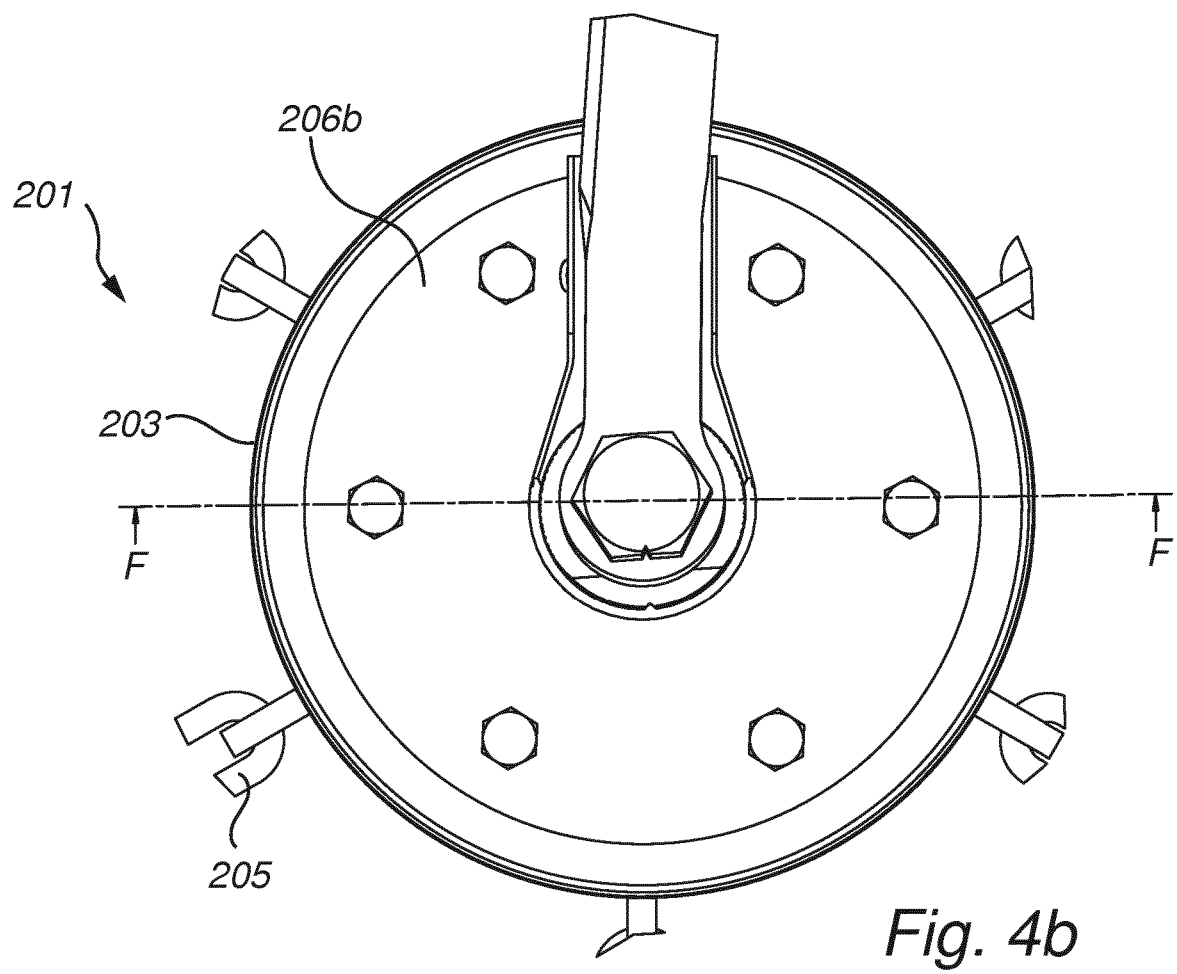
Figure 4C:
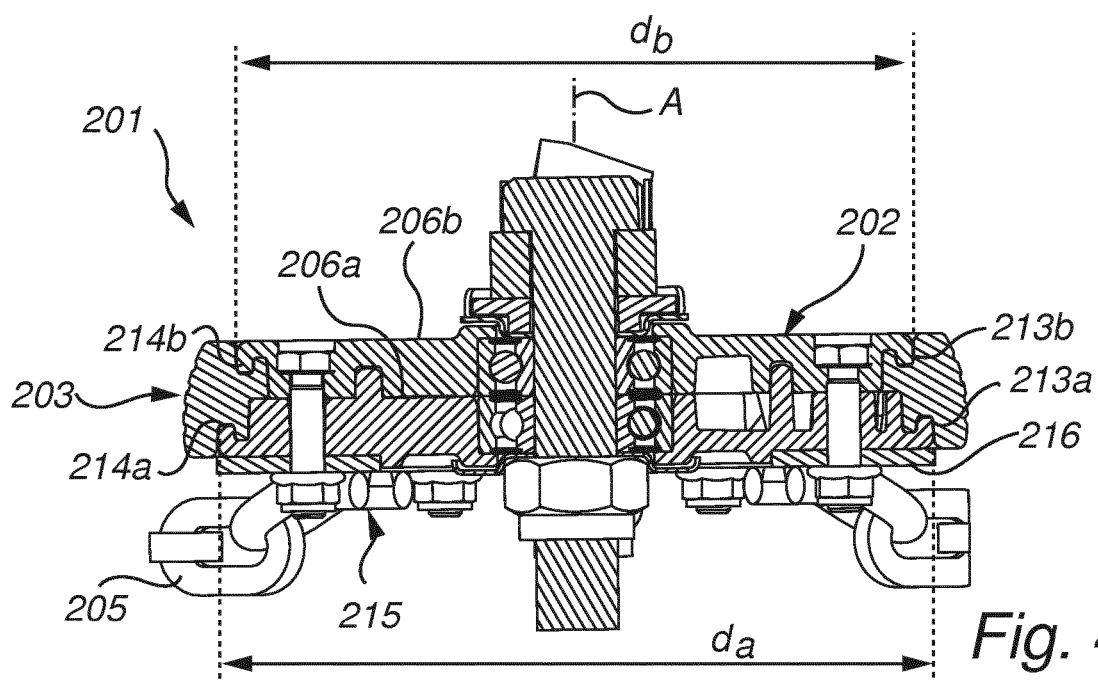
FIG. 4c shows a cross-sectional view along the line F-F in FIG. 4b.

FIGS. 4a, 4b and 4c show an anti-skid arrangement 201 which will be further described below. This anti-skid arrangement 201 is similar to the ones described above with respect to FIGS. 1a to 3b.

As is clear from FIGS. 4a, 4b, the outer surface of the ring 203 of the friction wheel 202 is inclined with respect to the rotation axis A. More precisely, the outer surface is curved radially inward as seen in the direction from the lower part 206a to the upper part 206b. The two parts 206a, 206b of the friction wheel 202 in FIGS. 4a, 4b and 4c have different diameters. More precisely, the diameter $d_a$ of the lower part 206a is larger than the diameter $d_b$ of the upper part 206b. The difference $d_a-d_b$ between the diameters $d_a$, $d_b$ of the two parts 206a, 206b is usually chosen so that, for a given desired inclination of the outer surface of the ring 203, the radial thickness of the ring 203 is uniform. The outer diameter of the annular plate 216, to which the chains 205 of the chain plate 215 are attached, is approximately the same as the diameter $d_a$ of the lower part 206a. The circumferential edges of the two parts 206a, 206b are raised and form the protrusions 213a, 213b which engage the grooves 214a, 214b of the ring 203. The protrusions 213a of the lower part 206a are displaced radially outward relative to the protrusions 213b of the upper part 206b.

The person skilled in the art realizes that the present invention by no means is limited to the above-described example embodiments. Many modifications and variations are possible within the scope of the appended claims. For example, other types of fasteners than self-tapping screws and screws with nuts may clamp the components together.

The word "comprising" does not exclude the presence of other elements or steps than those listed in the claim. The word "a" or "an" preceding an element does not exclude the presence of a plurality of such elements.

What is claimed is:

1. An anti-skid arrangement for a vehicle, comprising:
   a friction wheel comprising a hub and a ring arranged around the hub, wherein the ring is intended to be brought in frictional engagement with a tire of the vehicle; and
   a chain plate attached to the hub, wherein the chain plate comprises several chains intended to be thrown under the tire in order to increase friction between the tire and the ground,
   wherein the hub comprises two parts clamping at least a portion of the ring,
   wherein an inner side of the ring is provided with grooves extending in a tangential direction of the ring and facing each hub part, and the two parts are provided with protrusions engaging the grooves,
   wherein at least one of the two parts is provided with projections engaging the ring so as to rotationally fix the ring in relation to the hub.

2. The anti-skid arrangement according to claim 1, wherein the grooves are formed by discrete elements separated by gaps, and wherein the projections of said at least one of the two parts engage said gaps.

3. The anti-skid arrangement according to claim 1, wherein the grooves extend continuously along the ring, and the ring is further provided with fixating elements extending radially inwards from the grooves, and wherein the projections of said at least one of the two parts engage the ring between the fixating elements so as to rotationally fix the ring to the hub.

4. The anti-skid arrangement according to claim 1, wherein an outer side of the ring is inclined with respect to a central axis of the friction wheel.

5. The anti-skid arrangement according to claim 1, wherein the two parts are provided with corresponding protruding pins and recesses, wherein the pins and recesses engage each other so as to rotationally fix the two parts relative to each other.

6. The anti-skid arrangement according to claim 1, wherein at least one drainage hole is provided in at least one of the two parts.

7. The anti-skid arrangement according to claim 1, wherein the two parts and the chain plate are clamped together by fasteners extending through the two parts and the chain plate.

8. The anti-skid arrangement according to claim 1, further comprising at least one bearing enabling the friction wheel to rotate around the central axis, wherein the at least one bearing is sandwiched between the two parts.

9. The anti-skid arrangement according to claim 8, wherein the at least one bearing is arranged in a compartment formed by at least one annular ridge around the central axis.

10. The anti-skid arrangement according to claim 1, wherein the two parts have different diameters.

11. The anti-skid arrangement according to claim 1, wherein grooves facing different parts of the hub are displaced in a radial direction of the friction wheel relative to each other.

12. The anti-skid arrangement according to claim 1, wherein the two parts are identical.

* * * * *